April 16, 1940. H. R. EGGERS 2,197,635

TEMPERATURE MEASUREMENT AND CONTROL

Filed Nov. 9, 1937

Inventor:
Hermann R. Eggers,
by Harry E. Dunham
His Attorney.

Patented Apr. 16, 1940

2,197,635

UNITED STATES PATENT OFFICE 2,197,635

TEMPERATURE MEASUREMENT AND CONTROL

Hermann R. Eggers, Berlin, Germany, assignor to General Electric Company, a corporation of New York Application November 9, 1937, Serial No. 173,721 In Germany November 16, 1936

2 Claims. (Cl. 73—361)

My invention relates to temperature responsive apparatus and concerns particularly apparatus utilizing thermocouples for measuring or for automatically controlling temperatures.

It is an object of my invention to provide temperature responsive apparatus of the thermocouple or thermojunction type having increased accuracy and reliability and which is relatively unaffected by variations in resistance of the thermocouple or its leads or by variations in E. M. F. of an auxiliary voltage source.

Another object of my invention is to provide a connection for automatic temperature control apparatus in which the heating appliance will be turned off in case of failure of the thermocouple instead of being held on continuously and raising the temperature to a dangerous level.

Still another object of my invention is to provide cold junction temperature compensation.

Other and further objects and advantages will become apparent as the description proceeds.

There are in general two arrangements of thermocouple temperature responsive devices in use; the direct connected arrangement, and the potentiometer arrangement. In the former arrangement, an electric measuring instrument is connected directly to the thermocouple and the accuracy of the reading depends upon constancy of the resistance of the thermocouple and the connecting leads. The resistance is not always known; it depends upon the temperature and varies with the length of service of the thermocouple. In the potentiometer arrangement an auxiliary voltage is connected in opposition to that of the thermocouple so that no current flows in the measuring instrument at a given temperature and the effect of resistance variations is minimized. However, the reading of the instrument is greatly affected by variations in the magnitude of the auxiliary voltage and the same measuring instrument cannot be employed if the auxiliary voltage is removed.

In carrying out my invention in its preferred form, an auxiliary voltage of such magnitude as to cause no current to flow at a particular temperature, which may be any desired temperature, is applied in opposition to the thermocouple voltage. However, in order to make the apparatus independent of the magnitude of the auxiliary voltage, a bridge connection is chosen, in which the indicating or recording apparatus lies in the diagonal arm of the bridge and the thermocouple lies in a bridge arm. The resistances are so chosen that the instrument current is made independent of the auxiliary voltage.

Figure 1:
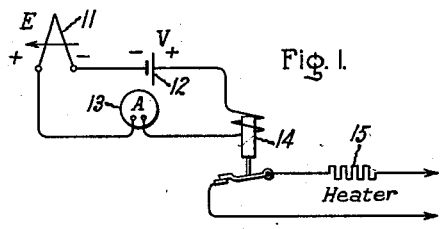
Figure 2:
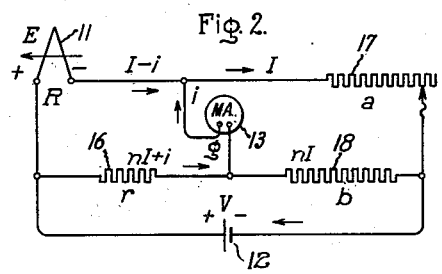
Figure 3:
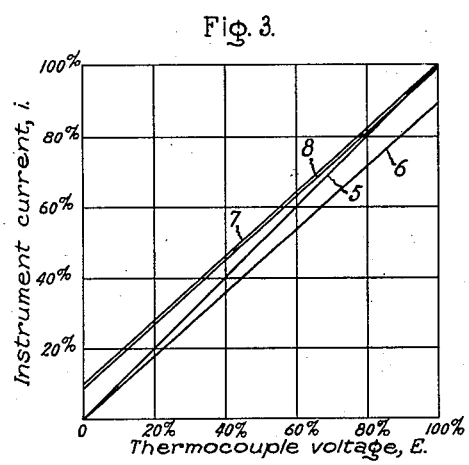
Figure 4:
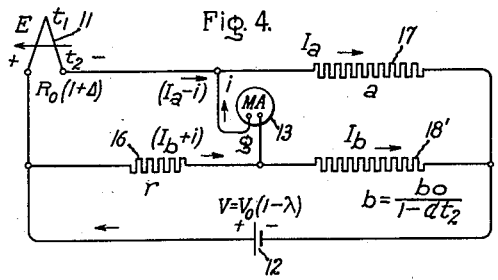

The invention may be understood more readily from the following detailed description when considered in connection with the accompanying drawing and those features of the invention which are believed to be novel and patentable will be pointed out in the claims appended hereto. In the drawing Fig. 1 is a circuit diagram representing the potentiometer connection of the prior art, for either indicating or controlling temperature; Fig. 2 is a circuit diagram of one embodiment of my invention; Fig. 3 is a graph explaining the principle of operation of my invention; and Fig. 4 is a circuit diagram of another embodiment of my invention. Like reference characters are utilized throughout the drawing to designate like parts.

In the prior art arrangement of Fig. 1, a thermocouple 11 is connected in series with an auxiliary voltage source 12, and a current responsive device, such as an indicating or recording ammeter 13, and a relay 14. The relay 14 controls a source of heat 15 in a furnace or heating system represented by the resistor 15. The connections are such that the voltage E of the couple 11, as shown by the arrow is in a direction opposing the voltage source 12, and the magnitude V of the voltage source 12 is such that at a predetermined temperature the voltages are balanced and no current flows in the thermocouple 11. When the temperature exceeds a predetermined value the relay 14 opens and cuts off the source of heat 15. However, in case the thermocouple 11 should burn out, which may readily happen, the relay 14 will remain unenergized and closed regardless of the temperature, causing the heater 15 to remain in circuit indefinitely so that dangerous overheating may result.

In order to overcome this hazard and in order to make the temperature indication independent of variation in the voltage of the source 12, I connect the current responsive devices in the cross arm or diagonal of a bridge circuit such as shown in Fig. 2, for example. The thermocouple 11 constitutes one arm of the bridge and resistors 16, 17 and 18 are added to form the remaining arms of a bridge, the arms 11 and 17 being connected in series to the voltage source 12, and the arms 16 and 18, likewise being connected in series to the source 12. For the sake of simplicity, only the milliammeter 13 is shown to represent whatever type of current responsive device is connected in the cross arm, but it will be understood that the connection of Fig. 2 is not limited to temperature measurement and may also be used for temperature control. The resistor 16 is such as to have a substantially constant resistance $r$, which bears a relationship to the resistance $R$ of thermocouple 11 which will later be explained. The resistances $a$ and $b$ of the bridge arms 17 and 18 also have a relationship which will later be explained.

The manner of operation of the apparatus will be explained by considering the relationship between the currents in various parts of the bridge. The following symbols are used:

$i$ represents the current in the instrument 13
$I$ represents the current in the bridge arm 17
$I-i$ represents the current in the thermocouple 11
$nI$ represents the current in the bridge arm 18
$n$ represents the ratio of currents in the bridge arms 18 and 17.
$nI+i$ represents the current in the resistor 16
$g$ represents the resistance of the instrument 13
$R$ represents the actual resistance of the thermocouple 11, including leads
$r$ represents the resistance of the resistor 16
$E$ represents the voltage of the thermocouple 11
$E_{max}$ represents the voltage of the thermocouple 11 for the maximum measured temperature.

Since the sum of the voltages in any complete circuit must equal zero, one may obtain the following equation by considering the voltages in the left-hand mesh of the bridge.

$$E + IR - iR - ir - nIr - ig = 0 \quad (1)$$

from which results $$i = \frac{E + I(R - nr)}{g + r + R} \quad (2)$$

The following additional symbols are now introduced:

$R_0$ represents the resistance of the thermocouple 11 (including leads) assumed in calibration.
$\Delta$ represents the deviation of $R$ from $R_0$
$I_0$ represents the theoretical current flowing in the bridge arm 17 for the assumed auxiliary voltage.
$\lambda$ represents the deviation of $I_0$ from $I$ accordingly $$R = R_0 (1 + \Delta) \quad (2a)$$
$$I = I_0 (1 - \lambda) \quad (2b)$$

and Equation 2 becomes $$i = \frac{E + I_0 R_0 \Delta - I_0 \lambda R_0 \Delta + I_0 (1 - \lambda)(R_0 - nr)}{g + r + R_0 + R_0 \Delta} \quad (3)$$

If one assumes that $R_0 = nr$, Equation 3 becomes $$i = \frac{E}{g + r + R_0} \cdot \frac{1 + \frac{I_0}{E} R_0 \Delta - \frac{I_0 \lambda}{E} R_0 \Delta}{1 + \frac{R_0 \Delta}{g + r + R_0}} \quad (4)$$

It will be understood that $nr$ is made equal to $R_0$ either by choice of $r$ or the choice of the ratio of resistances of arms 17 and 18.

Fig. 3 consists of a series of graphs representing the relationship between instrument current and thermocouple voltage for various different assumed circumstances. The current $i$ and the voltage $E$ are plotted as percentages of the values corresponding to maximum measured temperature.

If one assumes that the actual value of $R$ is that assumed in calibration of the apparatus, i. e., that equation $$R = R_0 \text{ or } \Delta = 0$$

Equation 4 becomes $$i = \frac{E}{g + r + R_0} \quad (5)$$

in which the current $i$ is independent of variations $\lambda$ in auxiliary voltage. Equation 5 is plotted in Fig. 3 and is represented by the line 5.

If the auxiliary voltage source 12 were removed so that the current, $I$, in the bridge arm 17 became zero, Equation 2b would become $$I = I_0 (1 - \lambda) = 0$$

or $$\lambda = 1$$

and Equation 4 would become $$i = \frac{E}{g + r + R_0} \cdot \frac{1}{1 + \frac{R_0 \Delta}{g + r + R_0}} \quad (5a)$$

If one assumes further that the resistance of the thermocouple 11 is too great and is of such a value that $$\frac{\Delta R_0}{g + r + R_0} = 0.11$$

Equation 5a becomes $$i = .9 \frac{E}{g + r + R_0} \quad (6)$$

Equation 6 is plotted as line 6 in Figure 3.

If the auxiliary voltage is correct but the resistance of the thermocouple is excessive and of the same value assumed for Equation 6, i. e.

$$\lambda = 0 \text{ and } \frac{\Delta R_0}{g + r + R_0} = 0.11$$

and if one further assumes that $$I_0 = \frac{E_{max}}{g + r + R_0} \quad (6a)$$

Equation 4 becomes $$i = \frac{E}{g + r + R_0} \cdot \frac{1 + \frac{E_{max}}{E} \cdot 0.11}{1 + 0.11} \quad (7)$$

Equation 7 is plotted in Fig. 3 as line 7.

If one assumes the same excessive thermocouples resistance and the same theoretical current, $I_0$, as before but assumes that the auxiliary voltage is $\frac{1}{10}$ too small, i. e.

$$\lambda = 0.1$$

Equation 4 becomes $$i = \frac{E}{g + r + R_0} \cdot \frac{1 + 0.099 \cdot \frac{E_{max}}{E}}{1.11} \quad (8)$$

Equation 8 is plotted in Fig. 3 as line 8.

The assumptions made in obtaining the graphs of Fig. 3 may be summarized as follows:

For graph 5 resistance $R$ of the thermocouple is correct, no other assumptions
For graph 6 auxiliary voltage removed and resistance $R$ has a predetermined excessive value
For graph 7 auxiliary voltage correct. Resistance $R$ as in 6
For graph 8 auxiliary voltage one tenth low. Resistance $R$ as in 6 and 7.

Inasmuch as measurements are usually made in the upper range between about 60 and 90%, it is apparent that the influence of variations of the thermocouple resistance is less with an auxiliary voltage than without and that for a predetermined temperature the effect of variation in thermocouple resistance can be exactly compensated. In the curves shown this temperature is the maximum temperature but by proper selection of the auxiliary voltage it can be made any other temperature.

If the resistances $a$ and $b$ of the bridge arms 17 and 18 respectively are made relatively great in comparison with the resistances $R$, $r$ and $g$, the currents in $a$ and $b$ are substantially inversely proportional to their resistances and $$\frac{a}{b} = n$$

since $n$ was the stipulated ratio between the currents. Since $r$ was so chosen as to make $$\frac{R_0}{r} = n$$

the bridge would be simply a balanced bridge when the thermocouple resistance $R$ is equal to $R_0$, i. e. has not varied from the originally assumed value. Mathematically stated, $$\frac{a}{b} = \frac{R_0}{r}$$

From Equation 5 it was seen that independently of the value of the auxiliary voltage if the thermocouple resistance remains constant, i. e., does not vary from its assumed value, $$i = \frac{E}{g+r+R_0}$$

and for maximum measured temperature $$i = \frac{E_{max}}{g+r+R_0}$$

In the Equation 6a it was assumed that the normal auxiliary voltage was of such a value that $$I_0 = \frac{E_{max}}{g+r+R_0}$$

In other words at the maximum measured temperuatre no current would flow in the thermocouple 11 even with a change in the resistance of the thermocouple, provided the auxiliary voltage remained constant at the original value. As shown by Fig. 3, line 7, full compensation is obtained at the maximum measured temperature and very good compensation is obtained at other temperatures in the vicinity. If full compensation is desired instead at some intermediate temperature, the auxiliary voltage is made such that no current flows in the thermocouple at the desired intermediate temperature at the time of calibration. The curves 5 and 7 would then intersect at the values corresponding to such an intermediate temperature.

Manifestly in a very precise determination, the ratio $n$ of the currents in the bridge arms 17 and 18 would depend not merely upon the ratio of resistances $a$ and $b$ but also upon the other resistance of the bridge. According to Kirchhoff's law:

$$Ia - nIb + ig = 0$$

$$n = \frac{i}{I} \cdot \frac{g}{b} + \frac{a}{b}$$

If either $a$ or $b$ is relatively large in comparison with $g$ $$n = \frac{a}{b}$$

and, since $r$ was chosen to make $$n = \frac{R_0}{r}$$

$$\frac{a}{b} = \frac{R_0}{r}$$

Without regard to the values of $a$ or $b$, for the temperature at which no current flows in the thermocouple 11, if its resistance is correct, $i = I$ and $$n = \frac{g+a}{b}$$

or $$\frac{g+a}{b} = \frac{R_0}{r}$$

Whenever conveniently possible, I prefer to have the resistance $a$ and $b$ relatively great in order that the resistance $g$ need not be considered and compensation will be obtained over a relatively wider range of conditions.

When the current in the thermojunction 11 is zero $I = i$ and the following equations hold:

$$i = \frac{E}{g+r+rn} = \frac{E}{g+r+R_0} \quad (8a)$$

$$V = r(nI+i) + gi + aI \quad (8b)$$

$$V = i(rn+r+g+a) = i(R_0+r+g+a) = \quad (8c)$$

$$V = \frac{E}{g+r+R_0} \times (R_0+r+g+a) \quad (8d)$$

When $a$ is large in comparison with $g$ $$V = \frac{E(R_0+r+a)}{g+r+R_0} \text{ or } V = \frac{E(rn+r+a)}{g+r+rn} \quad (8e)$$

When $a$ is large in comparison with $R_0$ and $r$ $$V = \frac{E(g+a)}{g+r+R_0} \quad (8f)$$

When $a$ is large in comparison with $R_0$, $r$ and $g$ $$V = \frac{Ea}{g+r+R_0} \quad (8g)$$

For relatively large values of both $a$ and $b$ in comparison with $r$ and $R_0$ $$n = \frac{a}{b}$$

and $$V = i\left(r\frac{a}{b} + r + a\right) = \frac{E}{g+r+\frac{a}{b}r}\left(r\frac{a}{b} + r + a\right) \quad (8h)$$

If the apparatus of Fig. 2 is used to control temperature and the current responsive device 13 is one to shut off the heat when a predetermined temperature is reached as explained in connection with the relay 14 of Fig. 1, the circuit of Fig. 2 guards against overheating in case the thermocouple 11 should burn out. In this case, current flows through the current responsive device 13 to shut off the heat regardless of temperature as a safety measure. Preferably for this purpose the auxiliary voltage of the source 12 is made relatively high since with normal thermocouple resistance the auxiliary voltage has no effect upon the instrument current but when the thermocouple burns out the auxiliary voltage sends a large current through the current responsive device 13. If the current responsive device 13 is an indicating instrument, failure of the thermocouple in the foregoing arrangement will be indicated by the pointer passing to its final scale value or beyond.

It was pointed out in connection with Equation 5 and curve 5 of Fig. 3, that when the thermocouple had the resistance assumed, for any temperature whatsoever no change in deflection would occur when the auxiliary voltage was varied. This constitutes a good test for constancy of the resistance of the thermocouple. If the test reveals that the resistance has varied from the assumed value, one or more of the resistances $r$, $a$ and $b$ is changed in value until the instrument deflection remains the same, regardless of whether the auxiliary voltage is switched on or off.

My invention is also adapted to providing cold junction temperature compensation by means of a temperature responsive electrical resistance. The connections are shown in Fig. 4, which is like Fig. 2, except that I substitute a temperature responsive resistor 18' for the resistor 18 of Fig. 2. It is assumed that the resistances $a$ and $b$ of the bridge arms 17 and 18' are large in comparison with the resistances, R and $r$, of the couple 11 and the resistor 16, respectively. Accordingly, the currents in the bridge arms 17 and 18' are expressed by the respective equations.

$$I_a = \frac{V}{a} \quad (8j)$$

$$I_b = \frac{V}{b} \quad (8k)$$

The resistance of the arm 18' is expressed by the equation $$b = b_0 \frac{1}{1-\alpha t_2} \quad (9)$$

where $b_0$ is the resistance at a reference temperature assumed to be a normal ambient temperature, $\alpha$ is the temperature coefficient of resistance in terms of the same reference temperature, and $t_2$ is the temperature of the cold junction of the thermocouple 11 compared with the assumed normal ambient temperature. It will be understood that the apparatus is so constructed that the cold junction of the couple 11 and the resistor 18' rest in proximity and are at the same temperature.

The resistances $r$, $a$ and $b$ are chosen to satisfy the equation $$\frac{R_0}{a} = \frac{r}{b_0} \quad (10)$$

According to Kirchhoff's law the voltage equation for the left-hand mesh of the bridge in Fig. 4 is $$E + (I_a - i)(1+\Delta)R_0 - ig - (I_b + i)r = 0 \quad (10a)$$

from which results, by substitution of the values of $I_a$ and $I_b$, in Equations 8j and 8k, $$i = \frac{E + \frac{V}{a}R_0 + \frac{V}{a}R_0\Delta - \frac{V}{b}r}{R_0 + R_0\Delta + g + r} \quad (10b)$$

but $V = V_0(1-\lambda)$ where $V_0$ is the auxiliary voltage for the original calibration, and $\lambda$ is, as previously, the deviation therein.

Accordingly, taking into consideration also Equation 10.

$$i = \frac{E + V_0\frac{R_0\Delta}{a} + V_0\frac{r}{b_0}\alpha t_2 - V_0\lambda\frac{R_0\Delta}{a} - V_0\lambda\frac{r}{b_0}\alpha t_2}{r + g + R_0 + R_0\Delta} \quad (11)$$

For the case when $\Delta=0$ and $t_2=0$ the instrument current is $$i = \frac{E}{r+g+R_0} \quad (11a)$$

being independent of the magnitude of the auxiliary voltage, and of course, precisely represents the measured temperature. For the case when $\lambda=0$, and $t_2=0$ Equation 11 becomes $$i = \frac{E + V_0\frac{R_0\Delta}{a}}{r+g+R_0+R_0\Delta} \quad (12)$$

When the temperature to be measured is at a definite value at which the thermocouple voltage is $$E = \frac{r+g+R_0}{a} \cdot V_0 \quad (12a)$$

the term $$V_0\frac{R_0\Delta}{a}$$

drops out of Equation 12 so that the indication is substantially independent of thermocouple resistance. Accordingly, when exact compensation is desired at a particular temperature in the vicinity of which most measurements are expected to fall the values of resistance and auxiliary voltage are chosen to satisfy Equation 12a. For the condition when $\lambda=0$ and $\Delta=0$ Equation 11 becomes $$i = \frac{E + V_0\frac{r}{b_0}\alpha t_2}{r+g+R_0} \quad (13)$$

in which the term $$V_0\frac{r}{b_0}\alpha t_2$$

represents the cold junction voltage or the correction in the net thermocouple voltage E necessary to take into account cold junction temperature $t_2$. The thermocouple will have a definite cold junction voltage $E''$ for a given cold junction temperature $t_2$. Accordingly the values of resistance and auxiliary voltage are chosen to satisfy the equation:

$$E'' = V_0\frac{r\alpha t_2}{b_0} \quad (13a)$$

and the reading is made independent of variations in cold junction temperature.

Inasmuch as the values $\lambda$, $\Delta$, $\alpha$ and $t_2$ will be small quantities the products of $\lambda\Delta$ and $\lambda\alpha t_2$ can be disregarded in Equation 11 and Equation 13 holds even when variations take place in thermocouple resistance and auxiliary voltage and therefore the instrument current represents the measured temperature fully compensated for variations in cold junction temperature.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A temperature responsive device, of the thermocouple type compensated at a predetermined temperature against variations in resistance of the thermocouple, comprising a bridge circuit including a source of current energizing the bridge, a current responsive instrument in the cross arm of the bridge and a thermocouple in one of the main arms of the bridge, the polarity of the voltage of the current source being the opposite of the polarity of the voltage generated in the thermocouple by heat, the magnitude of the voltage of the current source being sufficient to produce zero current in the thermocouple at the temperature for which the apparatus is to be fully compensated.

2. A temperature responsive device of the thermocouple type having cold junction compensation comprising a voltage source having a voltage V, a thermocouple and a resistor connected in series to said voltage source, a resistor having a resistance —r— and a temperature variable resistor having a resistance B at a predetermined temperature also connected in series to said voltage source, the resistor —r— being connected to the same side of the voltage source as the thermocouple, and a current responsive device connected as a cross arm to form a bridge circuit, the relationship between the resistances and the magnitude of the voltage source being substantially determined by the equation:

$$V = \frac{Be}{r\alpha T}$$

where —e— is the cold junction voltage of the thermocouple at a given temperature T above the said predetermined temperature, and $\alpha$ is the temperature coefficient of resistance of the variable resistance resistor with respect to the same predetermined temperature.

HERMANN R. EGGERS.